US009386464B2

(12) United States Patent
Wong

(10) Patent No.: US 9,386,464 B2
(45) Date of Patent: Jul. 5, 2016

(54) AUTOMATIC NEIGHBOUR RELATION

(75) Inventor: Shin Horng Wong, Chippenham (GB)

(73) Assignee: Alcatel Lucent, Boulogne-Billancourt (FR)

( * ) Notice: Subject to any disclaimer, the term of this patent is extended or adjusted under 35 U.S.C. 154(b) by 149 days.

(21) Appl. No.: 13/983,901

(22) PCT Filed: Jan. 26, 2012

(86) PCT No.: PCT/EP2012/000345
§ 371 (c)(1),
(2), (4) Date: Nov. 1, 2013

(87) PCT Pub. No.: WO2012/107175
PCT Pub. Date: Aug. 16, 2012

(65) Prior Publication Data
US 2014/0057628 A1 Feb. 27, 2014

(30) Foreign Application Priority Data
Feb. 10, 2011 (EP) .................................... 11360008

(51) Int. Cl.
*H04W 24/00* (2009.01)
*H04W 24/02* (2009.01)
*H04W 88/02* (2009.01)

(52) U.S. Cl.
CPC .............. *H04W 24/02* (2013.01); *H04W 88/02* (2013.01)

(58) Field of Classification Search
CPC ............ H04W 24/02; H04W 36/0001; H04W 36/0083; H04W 60/04; H04W 24/00; H04W 68/06; G01S 5/0242
See application file for complete search history.

(56) References Cited

U.S. PATENT DOCUMENTS

| 7,065,361 B1* | 6/2006 | Fortuna ................. H04W 24/02 455/436 |
| 7,848,292 B2* | 12/2010 | Bi ...................... H04W 36/0083 370/331 |
| 2009/0264130 A1* | 10/2009 | Catovic et al. ................ 455/436 |
| 2010/0035633 A1* | 2/2010 | Park .................... H04W 64/003 455/456.1 |

(Continued)

OTHER PUBLICATIONS

Renesas Electronics Europe, "Logged ANR method considerations," 3rd Generation Partnership Project (3GPP), 3GPP TSG-RAN WG2 Meeting #72bis, R2-110305, XP050474236, 7 pages, Dublin, Ireland, Jan. 17-21, 2011.

(Continued)

*Primary Examiner* — Mahendra Patel
(74) *Attorney, Agent, or Firm* — Fay Sharpe, LLP

(57) ABSTRACT

A mobile device operable to perform automatic neighbor relation functions in a wireless telecommunications network, a radio network controller, methods and a computer program product are disclosed. The mobile device is operable to perform automatic neighbor relation functions in a wireless telecommunications network in which neighbor relations derived by the mobile device are provided to a network node of the wireless telecommunications network and comprises: measurement logic operable, in an automatic neighbor relation mode, to measure characteristics of a neighboring cell; and determination logic operable to determine, from the characteristics and from an indication of previously provided neighbor relations, whether a neighbor relation based on the characteristics has been provided previously to the network node and, if not, to generate a new neighbor relation to be provided to the network node. Hence, only neighbor relations which are not indicated as having been provided previously need be generated.

20 Claims, 4 Drawing Sheets

(56) References Cited

U.S. PATENT DOCUMENTS

| | | | | |
|---|---|---|---|---|
| 2010/0081454 | A1* | 4/2010 | Wang et al. | 455/456.1 |
| 2010/0120447 | A1* | 5/2010 | Anderson | H04W 64/003 |
| | | | | 455/456.1 |
| 2012/0178451 | A1* | 7/2012 | Kubota et al. | 455/436 |
| 2013/0183982 | A1* | 7/2013 | Martin | H04W 36/0061 |
| | | | | 455/437 |

OTHER PUBLICATIONS

Alcatel-Lucent, "Scenarios to consider for ANR," 3$^{rd}$ Generation Partnership Project (3GPP), 3GPP TSG-RAN WG2 Meeting #71bis, R2-105671, XP050452516, 4 pages, Xi'An, China, Oct. 11-15, 2010.
Alcatel-Lucent, "Provisioning UE for ANR, comparison of methods," 3$^{rd}$ Generation Partnership Project (3GPP), 3GPP TSG-RAN WG2 Meeting #71bis, R2-105672, XP050452517, 4 pages, Xi'An, China, Oct. 11-15, 2010.
Alcatel-Lucent et al., "Logging and Reporting of ANR Measurements," 3$^{rd}$ Generation Partnership Project (3GPP), 3GPP TSG-RAN WG2 Meeting #72bis, R2-110117, XP050474044, 3 pages, Dublin, Ireland, Jan. 17-21, 2011.
Ericsson et al., "Method for ANR support in UTRAN," 3$^{rd}$ Generation Partnership Project (3GPP), 3GPP TSG-RAN WG2 #72, R2-106442, XP050467150, pp. 1-13, Jacksonville, FL, USA, Nov. 15-19, 2010.
European Search Report for EP 11360008.4 dated Jun. 27, 2011.
PCT Pat. App. No. PCT/EP2012/000345, International Search Report, mailed Oct. 29, 2013, 3 pp.
PCT Pat. App. No. PCT/EP2012/000345, Written Opinion of the International Searching Authority, mailed Oct. 29, 2013, 10 pp.

* cited by examiner

AUTOMATIC NEIGHBOUR RELATION

FIELD OF THE INVENTION

The present invention relates to a mobile device operable to perform automatic neighbour relation functions in a wireless telecommunications network, a radio network controller, methods and a computer program product.

BACKGROUND

Wireless telecommunications systems are known. In a cellular system, radio coverage is provided by areas known as cells. A base station is located in each cell to provide the radio coverage. Each base station may support several cells. Traditional base stations provide coverage in relatively large geographical areas and the cells are often referred to as macro cells. It is possible to provide smaller sized cells within a macro cell. Such smaller sized cells are sometimes referred to as micro cells, pico cells or femto cells. One way to establish a small cell is to provide a small cell base station that provides coverage having a relatively limited range within the coverage area of a macro cell. The transmission power of a small cell base station is relatively low and, hence, each small cell provides a small coverage area compared to that of a macro cell and covers, for example, an office or a home.

Such small cells are typically provided where the communications coverage provided by the macro cell is poor or a user wishes to use an alternative communications link provided locally by the small cell base station to communicate with the core network. Such a situation may arise where, for example, a user has a pre-existing communications link and the user wishes to utilise that link in preference to that provided by the macro cell network provider to communicate with the core network.

A typical small cell base station utilises a broadband Internet protocol connection as backhaul for connecting to the core network. One type of broadband connection is a Digital Subscriber Line (DSL) which connects a DSL transceiver of the small cell base station to the core network. The DSL enables voice calls and other services provided via the small cell base station to be supported. The small cell base station may also connect using an Ethernet connection to the Internet. The small cell base station also includes a Radio Frequency (RF) transceiver connected to an antenna for radio communication within a small cell. The small cell base station generates a small cell typically in the vicinity of a building, with which user equipment may communicate with in preference to a base station of the macro cell.

In order to allow users to roam throughout the network, it is necessary for the network operator to be able to identify the geographical relationship between cells to enable handover between cells to occur. In particular, it is necessary for the network operator to identify, for each cell, those cells which neighbour that cell. The identified neighbour cells are typically put into a neighbour cell list (NCL) which can then be used for cell re-selection and handover purposes.

It is not uncommon for cells that could act as neighbours to not be identified as neighbouring cells and a missing neighbour can cause both a call to be dropped or unnecessary interference. This is particularly the case for small cells whose locations are determined by users rather than by the network provider.

Automatic neighbour relations (ANR) use mobile devices such as user equipment or machine-type communication devices to detect for missing neighbours and report these missing neighbours to the network. The network selects a number of ANR enabled user equipment or machine-type communication devices and instructs them to perform ANR operations. Such devices, when not active (such as when in the idle mode, cell URA PCH state or other state), perform cell detection and undertake measurements of neighbouring cells when in the ANR mode. The device logs the cell ID of the missing neighbour, the current cell ID of the supporting cell (i.e. the source or supporting cell where the missing neighbour was detected) and measurements related to the missing neighbour. A neighbour relation is then generated showing that a potential neighbour relationship exists between the source cell and the detected neighbour. The network then identifies which of these detected neighbours can potentially act as a neighbour cell.

Although this approach helps to identify potentially missing neighbours, undesirable consequences can occur. Accordingly, it is desired to provide an improved technique for performing automatic neighbour relation functions.

SUMMARY

According to a first aspect, there is provided a mobile device operable to perform automatic neighbour relation functions in a wireless telecommunications network in which neighbour relations derived by the mobile device are provided to a network node of the wireless telecommunications network, the mobile device comprising: measurement logic operable, in an automatic neighbour relation mode, to measure characteristics of a neighbouring cell; and determination logic operable to determine, from the characteristics and from an indication of previously provided neighbour relations, whether a neighbour relation based on the characteristics has been provided previously to the network node and, if not, to generate a new neighbour relation to be provided to the network node.

The first aspect recognizes that it is possible that because a mobile device will typically perform automatic neighbour relation functions intermittently, since such functions are typically only performed when the mobile device is in an inactive state, it is possible that the mobile device will detect a previously reported neighbour relation again and, when it moves into an active state, it will report the same neighbour relation to the network. The first aspect also recognizes that this provides the network with redundant information. This wastes network resources to support the transmission and processing of that redundant information, as well as wastes mobile device resources in the collection of that information. In particular, the mobile device may typically consume unnecessary additional battery power to perform some measurements that may be required for the duplicate neighbour relation.

Accordingly, a mobile device which may perform automatic neighbour relation functions is provided. The mobile device may comprise measurement logic which, in an automatic neighbour relation mode, may measure characteristics of a neighbouring cell. Determination logic may also be provided which may determine, from those measured characteristics and from an indication which indicates previously provided neighbour relations, whether a neighbour relation based on the measured characteristics has been provided previously to another network node in the wireless telecommunications network. If it is not indicated that such a neighbour relation has been provided previously, then a new neighbour relation may be generated which may subsequently be provided to another network node in a neighbour relation report.

In this way, it can be seen that only neighbour relations which are not indicated as having been provided previously need be generated. Accordingly, no neighbour relation may be generated when an indication is provided that that neighbour relation has already been provided. This avoids transmitting redundant information, which reduces traffic in the network and reduces the unnecessary use of resources to transmit and process such duplicated information. This reduces the load in the network and in the mobile device. Furthermore, the power consumption of the mobile device may be reduced as a consequence.

In one embodiment, each neighbour relation comprises an indication of a serving cell supporting the network node and an indication of a neighbouring cell. Accordingly, the neighbour relation may contain both an indication of the serving cell supporting the network node and an indication of the neighbouring cell which was detected. It is this relationship between the cells, rather than the existence of the cells per se which may be defined by each neighbour relation.

In one embodiment, the mobile device comprises a neighbour relation log operable to store the new neighbour relation as an entry. Accordingly, each new neighbour relation may be stored as an entry in a neighbour relation log. It will be appreciated that the neighbour relation log may indicate the new neighbour relations determined since activating detection aspects of the automatic neighbour relation mode. This provides a convenient mechanism for storing new neighbour relations.

In one embodiment, the neighbour relation log comprises a previously provided indicator operable to indicate when an associated neighbour relation has been provided previously to the network node. Accordingly, the neighbour relation log may comprise an indicator which indicates when an entry within the neighbour relation log has been provided previously to the network. It can be seen that the network node is then able to determine whether a detected neighbour relation has already been provided to the network by simply referring to the indicator in the neighbour relation log.

In one embodiment, the determination logic is operable to store the new neighbour relation by replacing an entry whose previously provided indicator indicates that the entry has been previously provided to the network node. Accordingly, a new neighbour relation may overwrite a previous neighbour relation. It will be appreciated that this may occur when the size of the neighbour relation log is limited. When selecting which entry to overwrite, the network node may overwrite an entry for a neighbour relation which has previously been provided to the network in preference to overwriting a neighbour relation which is indicated as having not yet been reported to the network. This improves the likelihood of a new neighbour relation being reported to the network.

In one embodiment, the mobile device comprises a history list operable to store neighbour relations provided previously to the network node. Accordingly, a history list may be provided which contains details of neighbour relations previously reported to the network. Such a history log may be referred to in order to determine whether a detected neighbouring cell provides a neighbour relation which has not been provided previously to the network.

In one embodiment, each neighbour relation comprises a weight indication indicating how often a neighbouring cell has been detected by the mobile device. Accordingly, a determination may be made of how often a neighbouring cell has been detected and a weighting may be derived from this. The weighting may be included in the neighbour relation in order to indicate how often that neighbour relation has been detected. It will be appreciated that a neighbouring cell which is detected more frequently and which therefore has a higher weighting is more likely to be a suitable neighbour than one detected less often. Accordingly, this weighting may help the network determine whether a neighbour relation provides an indication of a suitable neighbouring cell.

In one embodiment, the determination logic is operable to store the new neighbour relation by replacing an entry whose weight indication indicates that the entry has been detected least by the mobile device. Accordingly, should a new neighbour relation need to be stored, and no empty entries are available, then the neighbour relation having the least weighting may be overwritten since this neighbour relation may relate to the least likely neighbouring cell. It will be appreciated that the entries overwritten may be in either the history list and/or the neighbour relation log. This is because using the weight to determine which neighbour relation entry to replace is applicable to embodiments that use a separate history list and embodiment that use an indicator in the existing neighbour relation list. For the history list case, the history list may not be long enough and since mobile device may make multiple connections thereby providing multiple neighbour reports, it is desirable to keep old neighbour reports. For example, the mobile device detects cell 1, reports it and puts this in the history list. Then mobile device finds cell 2 and connects, reports and puts in this in the history list. It is desirable to keep cell 1 since the mobile device may go back to automatic neighbour relations mode and then re-detect cell 1. However, the history list may not be long enough to store both cell 1 and cell 2 (i.e. it may have already stored some other cells) and hence this indicator is useful to determine which entry to discard. In one embodiment, the measurement logic is operable to measure characteristics of a pilot signal from the neighbouring cell. Accordingly, the characteristics of a pilot signal from the neighbouring cell may be measured to determine the characteristics of the neighbouring cell. It will be appreciated that measuring characteristics of a pilot signal consumes relatively few resources and is reasonably straightforward for a mobile device to do.

In one embodiment, the characteristics of the pilot signal from the neighbouring cell comprise at least one of a primary synchronisation code and a signal strength. Accordingly, the primary synchronisation code and signal strength may be measured as characteristics of the detected neighbouring cell. It will be appreciated that there is a link between primary synchronisation code and cell ID and, hence, the primary synchronisation code may provide an indication of cell ID. Again, measuring the primary synchronisation code and signal strength is a relatively straightforward task which consumes few resources. Should the network node determine from that primary synchronisation code that a neighbour relation for the detected neighbouring cell has been provided previously to the network, then no further measurements may be required.

In one embodiment, the measurement logic is operable to measure further characteristics of the neighbouring cell. Accordingly, when required, further characteristics of the neighbouring cell may be measured.

In one embodiment, the further characteristics comprise at least one of a cell identifier, a frequency and a Public Land Mobile Network identifier. Accordingly, one or more of a cell identifier, a frequency or a public land mobile network identifier may be measured by the network node. It will be appreciated that measuring these characteristics may require additional resources within the network node to be utilised.

In one embodiment, the mobile device is operable, upon interrupting the automatic neighbour relation mode, to provide the new neighbour relations to the network node. Accordingly, when the network node or the mobile device itself interrupts the detection operations of the neighbour relation mode, those new neighbour relations which have been identified during detection may be provided to the network. It will be appreciated that these new neighbour relations may represent just a sub-set of all of the neighbour relations detected by the user equipment whilst in the automatic neighbour relation mode. By only sending a sub-set, the communications overhead is reduced, as are the resources required to process that information.

In one embodiment, the mobile device is operable, upon interrupting the automatic neighbour relation mode, to provide the weight indications associated with at least the new neighbour relations to the network node. Providing the weight indications enables the network to make an assessment of the likely value of a detected cell as a neighbour. Those neighbour relations having a higher weight may indicate a more suitable neighbouring cell, whereas those with a lower weight may indicate a less suitable neighbouring cell. This can be used when updating the neighbour cell list.

In one embodiment, the mobile device comprises control logic operable to alter entries of at least one of the neighbour relation log and the history list in response to an indication received from the network node. Accordingly, the network may make adjustments to the neighbour relation log and history list as required to influence the neighbour relation detection function of the mobile device.

In one embodiment, the control logic is operable to preload entries of at least one of the neighbour relation log and the history list in response to an indication from the network node. Hence, the network may provide its own history list in order to prevent, for example, well-established neighbouring cells from being reported or undesirable neighbouring cells from being reported.

In one embodiment, the control logic is operable to delete entries of at least one of the neighbour relation log and the history list in response to an indication from the network node. Accordingly, the history list may be deleted in order to cause all newly detected cells to be reported.

According to a second aspect, a method of performing automatic neighbour relation functions in a wireless telecommunications network in which neighbour relations derived by a mobile device are provided to a network node of the wireless telecommunications network, the method comprising the steps of: measuring, in an automatic neighbour relation mode, characteristics of a neighbouring cell; and determining, from the characteristics and from an indication of previously provided neighbour relations, whether a neighbour relation based on the characteristics has been provided previously to the network node and, if not, generating a new neighbour relation to be provided to the network node.

In one embodiment, each neighbour relation comprises an indication of a serving cell supporting the mobile device and an indication of a neighbouring cell.

In one embodiment, the method comprises the step of storing the new neighbour relation as an entry in a neighbour relation log.

In one embodiment, the neighbour relation log comprises a previously provided indicator operable to indicate when an associated neighbour relation has been provided previously to the network node.

In one embodiment, the step storing comprises storing the new neighbour relation by replacing an entry whose previously provided indicator indicates that the entry has been previously provided to the network node.

In one embodiment, the method comprises the step of storing neighbour relations provided previously to the network node in a history list.

In one embodiment, each neighbour relation comprises a weight indication indicating how often a neighbouring cell has been detected by the mobile device.

In one embodiment, the step storing comprises storing the new neighbour relation by replacing an entry whose weight indication indicates that the entry has been detected least by the mobile device.

In one embodiment, the step of measuring comprises measuring characteristics of a pilot signal from the neighbouring cell.

In one embodiment, the characteristics of the pilot signal from the neighbouring cell comprise at least one of a primary synchronisation code and a signal strength.

In one embodiment, the step of measuring comprises measuring further characteristics of the neighbouring cell.

In one embodiment, the further characteristics comprise at least one of a cell identifier, a frequency and a Public Land Mobile Network identifier.

In one embodiment, the method comprises the step of upon interrupting the automatic neighbour relation mode, providing the new neighbour relations to the network node.

In one embodiment, the method comprises the step of upon interrupting the automatic neighbour relation mode, providing the weight indications associated with at least the new neighbour relations to the network node.

In one embodiment, the method comprises the step of altering entries of at least one of the neighbour relation log and the history list in response to an indication received from the network node.

In one embodiment, the method comprises the step of preloading entries of at least one of the neighbour relation log and the history list in response to an indication from the network node.

In one embodiment, the method comprises the step of deleting entries of at least one of the neighbour relation log and the history list in response to an indication from the network node.

According to a third aspect, there is provided a radio network controller operable to configure automatic neighbour relation functions in a mobile device of a wireless telecommunications network, the radio network controller comprising: configuration logic operable to configure automatic neighbour relation functions in the mobile device by instructing the mobile device to alter entries of at least one of a neighbour relation log and a history list storing neighbour relations; and reception logic operable to receive neighbour relations from the mobile device.

In one embodiment, each neighbour relation comprises an indication of a serving cell supporting the mobile device and an indication of a neighbouring cell together with an associated weight indication indicating how often the neighbouring cell has been detected by the mobile device and the radio network controller comprises neighbour cell list logic operable to determine whether to add a neighbouring cell to a neighbouring cell list for a serving cell indicated by a received neighbour relation based on the associated weight indication.

In one embodiment, the configuration logic is operable to instruct the mobile device to delete entries of at least one of a neighbour relation log and a history list storing neighbour relations.

In one embodiment, the configuration logic is operable to instruct the mobile device to delete entries of at least one of a neighbour relation log and a history list storing neighbour relations associated with a neighbour relation specifying a supporting cell and a predetermined neighbouring cell.

In one embodiment, the configuration logic is operable to instruct the mobile device to preload entries of at least one of a neighbour relation log and a history list storing neighbour relations. Accordingly, the radio network controller may be operable to black-list a cells for which automatic neighbour reporting shall not be done. For example, a list of Physical Cell Identifiers or Cell IDs that are not be reported may be preloaded into the mobile device because the radio network controller knows that they are unsuitable for handover within the serving cell (a so called hot-spot area created by a base station that is far way, but yet the radio path loss is low on account of peculiar radio propagation conditions).

In one embodiment, the configuration logic is operable to instruct the mobile device to preload at least one neighbour relation specifying a supporting cell and a predetermined neighbouring cell of at least one of a neighbour relation log and a history list storing neighbour relations.

According to a fourth aspect, there is provided a method of configuring automatic neighbour relation functions in a mobile device of a wireless telecommunications network, the method comprising the steps of: configuring automatic neighbour relation functions in the mobile device by instructing the mobile device to alter entries of at least one of a neighbour relation log and a history list storing neighbour relations; and receiving neighbour relations from the mobile device.

In one embodiment, each neighbour relation comprises an indication of a serving cell supporting the mobile device and an indication of a neighbouring cell together with an associated weight indication indicating how often the neighbouring cell has been detected by the mobile device and the method comprises the step of determining whether to add a neighbouring cell to a neighbouring cell list for a serving cell indicated by a received neighbour relation based on its associated weight indication.

In one embodiment, the step of configuring comprises instructing the mobile device to delete entries of at least one of a neighbour relation log and a history list storing neighbour relations.

In one embodiment, the step of configuring comprises instructing the mobile device to delete entries of at least one of a neighbour relation log and a history list storing neighbour relations associated with a neighbour relation specifying a supporting cell and a predetermined neighbouring cell.

In one embodiment, the step of configuring comprises instructing the mobile device to preload entries of at least one of a neighbour relation log and a history list storing neighbour relations.

In one embodiment, the step of configuring comprises instructing the mobile device to preload at least one neighbour relation specifying a supporting cell and a predetermined neighbouring cell of at least one of a neighbour relation log and a history list storing neighbour relations.

According to a fifth aspect, there is provided a computer program product operable, when executed on a computer, to perform the method steps of the second or fourth aspect.

Further particular and preferred aspects are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further, with reference to the accompanying drawings, in which.

NETWORK OVERVIEW

Figure 1:
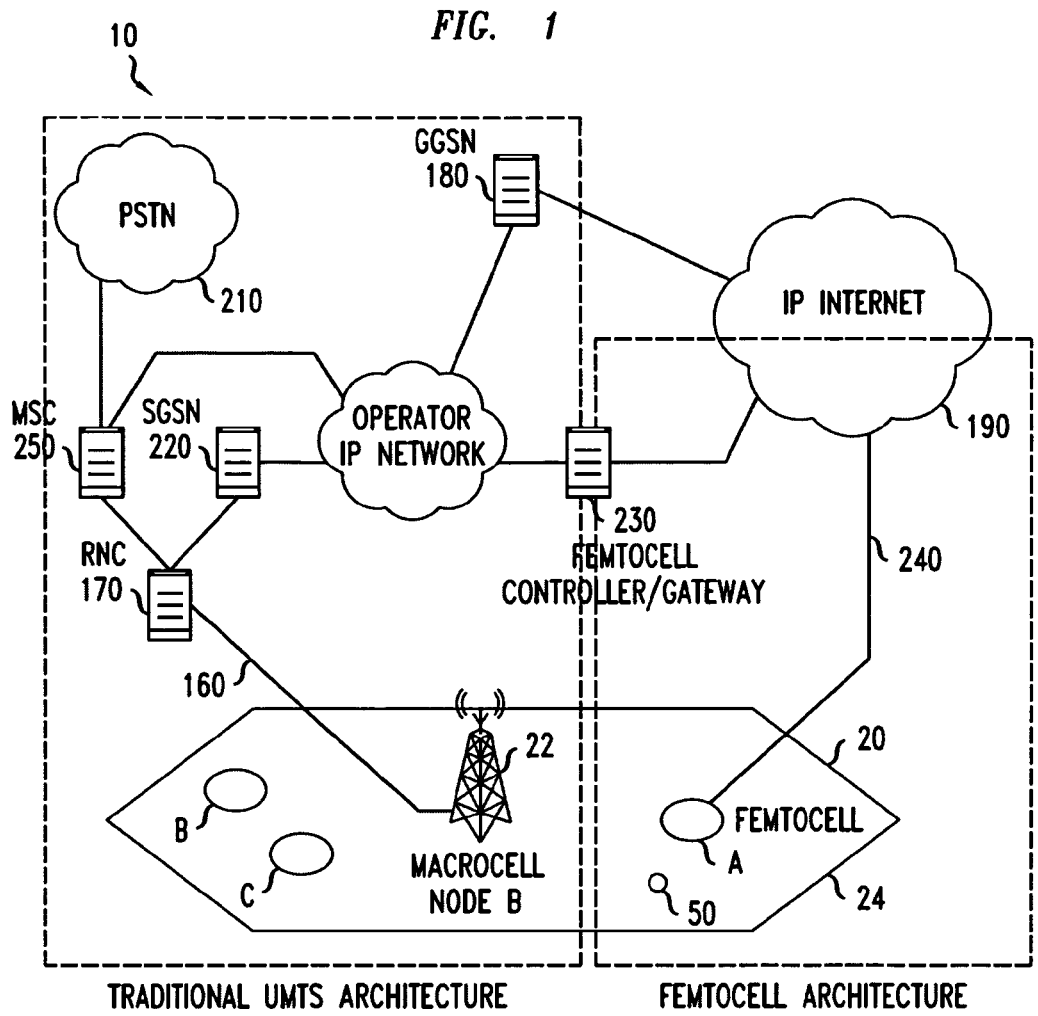
FIG. 1 illustrates the main components of a wireless telecommunications network according to one embodiment.

FIG. 1 illustrates a wireless communication system, generally 10, according to one embodiment. Mobile devices such as user equipment 50 or machine type communication devices (not shown) roam through the wireless communication system 10. Base stations 22 are provided which support respective macro cells 24. A number of such base stations are provided, which are distributed geographically in order to provide a wide area of coverage to the user equipment 50. When user equipment 50 is within a macro cell 24 supported by the base station 22 then communications may be established between the user equipment 50 and the base station 22 over an associated radio link. Each base station typically supports a number of sectors and may support a number of cells. Typically, a different antenna within a base station supports an associated sector. Of course, it will be appreciated that FIG. 1 illustrates a small subset of the total number of user equipment and base stations that may be present in a typical communications system.

The wireless communication system 10 is managed by a radio network controller 170. The radio network controller 170 controls the operation of the wireless communications system 10 by communicating with the base stations 22 over a backhaul communications link 160. The network controller 170 also communicates with the user equipment 50 via their respective radio links in order to efficiently manage the wireless communication system 10.

The radio network controller 170 maintains a neighbour cell list (NCL) which includes information about the geographical relationship between cells supported by base stations. In addition, the radio network controller 170 maintains location information which provides information on the location of the user equipment 50 within the wireless communications system 10. The radio network controller 170 is operable to route traffic via circuit-switched and packet-switched networks. Hence, a mobile switching centre 250 is provided with which the radio network controller 170 may communicate. The mobile switching centre 250 then communicates with a circuit-switched network such as a public switched telephone network (PSTN) 210. Likewise, the network controller 170 communicates with service general packet radio service support nodes (SGSNs) 220 and a gateway general packet radio support node (GGSN) 180. The GGSN then communicates with a packet-switch core 190 such as, for example, the Internet.

Figure 2:
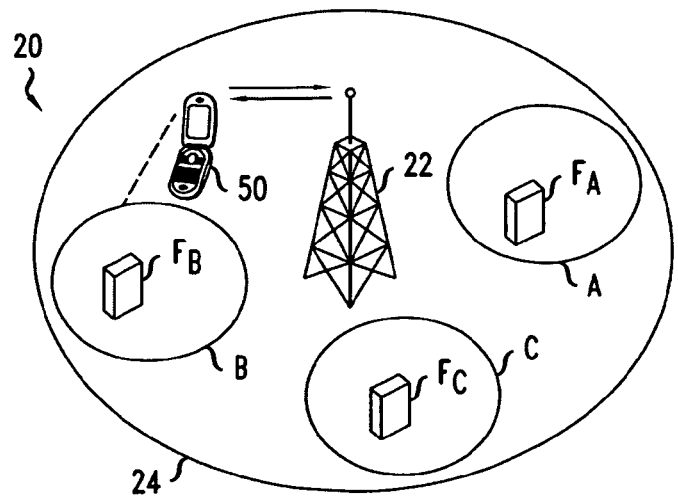
FIG. 2 illustrates a general small cell deployment within one macro cell shown in FIG. 1.

As shown in more detail in FIG. 2, there are provided small cell base stations $F_A$ to $F_C$, each of which provides a small cell A to C in the vicinity of a building within which the associated small cell base station is installed. The small cells A to C provide local communications coverage for a user in the vicinity of those buildings. Each small cell base station $F_A$ to $F_C$ communicates via a small cell controller/gateway 230. A handover or camping event may occur between the base station 22 and the small cell base stations $F_A$ to $F_C$ when the small cell base stations $F_A$ to $F_C$ detect that user equipment 50 comes within range. The small cell base stations $F_A$ to $F_C$ typically utilise the user's broadband Internet connection 240 (such as ADSL, Cable, Ethernet, etc.) as a backhaul.

Small cell base stations $F_A$ to $F_C$ are lower-power, low-cost, user-deployed base stations that provide a high cellular quality of service in residential or enterprise environment. In contrast to current macro cell approaches where complex and highly reliable base stations are deployed to strategic locations decided by the network owner, the small cell base stations $F_A$ to $F_C$ are provided locally by customers. Such small cell base stations $F_A$ to $F_C$ provide local coverage in areas of the macro network where quality of service may be low. Hence, the small cell base stations $F_A$ to $F_C$ provide for improved quality of service in areas which are difficult for network operators. To reduce the cost of the small cell base stations $F_A$ to $F_C$ and to reduce complexity and interference effects of the small cell on other user equipment within the macro cell, the transmission power of the small cell base station $F_A$ to $F_C$ is relatively low in order to restrict the size of the small cell to a range of tens of metres or less. The small cell base stations $F_A$ to $F_C$ have extensive auto-configuration and self-optimisation capability to enable a simply plug-and-play deployment. As such, they are designed to automatically integrate themselves into an existing macro cellular wireless network 10.

Operation Overview

In summary, embodiments each mobile device maintains a history of neighbour relations (that is, a detected neighbouring cell ID and the source or supporting cell ID where this detected neighbouring cell is detected) that have already been reported to the network (in the following example, to the radio network controller 170 and/or the small cell controller/gateway 230). In this way, if neighbour detection operations of automatic neighbour relation functions are reactivated in a mobile device after the mobile device has reported to the network its neighbour relation logs for a previous neighbour detection operation, the mobile device will be able to check its history to see whether a seemingly newly detected neighbour relation has already been reported to the network. It will be appreciated that it is an indication of the neighbour relation that is stored in the history. A neighbour relation comprises a source cell ID and a neighbour cell ID. Hence, a neighbour cell ID detected from a different source cell is a different neighbour relation. It is the relation that is logged, together with other measurements related to this relation. For example, detecting one cell when the mobile device is in a second cell is a different neighbour relation to the same cell being detected when the mobile device is in a third cell.

Neighbour Relation Log

The mobile device also maintains a neighbour relation log which contains measurements relating to the detected cells for each neighbour relation (for example, signal strength of the detected neighbour, its frequency and PLMID). This information is obtained by measurements made by the mobile device. These measurements are resource intensive because the mobile device has to demodulate the detected neighbour system information, which takes time. Such measurements also impact on the mobile device's battery because in order to measure this information the mobile device may have to exit discontinuous reception mode.

In addition, if the detected neighbour operates on a different frequency, the mobile device may need to stop receiving on its current frequency to tune into that other frequency, thereby introducing interruptions to its original service. Hence, if such measurements can be avoided because the mobile device determines that the detected neighbour relation is associated with a previously reported neighbour relation, then the mobile device avoids having to re-measure the signal strength and re-read the system information associated with the detected cell. Instead, the mobile device can detect the neighbouring cell using that cell's pilot (via its Primary Synchronization Code (PSC)), which consumes far fewer resources than having to synchronize to that cell and de-code the system information. Given the link between primary synchronization code and cell ID, the mobile device can determine from the history list whether the detected neighbour has been reported previously.

History List

The history mentioned above may be stored in a history list is generated and maintained by the mobile device and it contains a sub-set of the information contained in the neighbour relation log. For example, the history list may contain only the neighbour relation (that is, the cell ID and/or the PSC of the detected neighbour cell and the cell ID and/or PSC of the source cell in which the neighbour was detected), together with, optionally, the frequency and PLMNID. The history list will typically contain more neighbour relation entries than that of the neighbour relation log, since it occupies relatively fewer storage spaces.

Weighting

Each neighbour relation in the history list may have a weighting that is proportional to the number of times that this neighbour relation has been detected by the mobile device. This weight represents the probability of a neighbour relation being detected. If the history list is small (for example, it is smaller than the neighbour relation log entries), then the mobile device may need to select which previously reported neighbour relation should be maintained in the list and may need to replace existing entries in the history list to accommodate further detected neighbour relations. Given that the function of the history list is to reduce the likelihood of reporting duplicate neighbour relations to the network, a neighbour relation that is detected more frequently has a higher chance of being reported repeatedly. Accordingly, those neighbour relations having the lowest weightings are replaced in preference to those with a higher weighting. In addition to a weighting for each neighbour relation in the history list, the mobile device can provide a weighting for each neighbour relation that is in the neighbour relation log, so that after the mobile device has reported its neighbour relation log it can determine, based on that weighting, which neighbour relation from the neighbour relation log should also be stored in the history list. This weighting (in the form of a probability or a counter) can be reported to the network which can then determine whether a neighbouring cell identified by a neighbour relation needs to be included in the neighbour cell list for the source cell.

Combined Neighbour Relation Log and History List

In one embodiment, the history list and the neighbour relation log may be merged into a single table. Such an approach avoids having to maintain two separate tables and instead all the information may be contained in the neighbour relation log. To facilitate this, each neighbour relation entry in the neighbour relation log has an "old" indication (which could be provided by a single bit) to indicate whether this entry has already been reported to the network. In this embodiment, after the mobile device has reported its neighbour relation log it does not clear its neighbour relation log but, instead, sets the old bit for all the neighbour relation entries that have been reported. When the user equipment 50 returns to an inactive state and continues with its neighbour detection operations, whenever a neighbour cell is detected it will check against the neighbour relation entries in the neighbour relation log that has the old bit set. If this detected neighbour relation is already in the neighbour relation log, then it will not log this neighbour relation. If the detected neighbour relation is not in the neighbour relation log, then it will replace one of the old entries in the neighbour relation log since the number of neighbour relation entries in the neighbour relation log is likely to be limited. When an old entry is replaced, this entry's old bit will be re-set to indicate that the entry now relates to an unreported neighbour relation. The mobile device only reports entries in the neighbour relation log that are new to the network. After the mobile device has replaced an old neighbour relation entry in the neighbour relation log, this old neighbour relation is no longer in the history list and it is possible that the mobile device will detect this neighbour relation again, since it is no longer indicated in the neighbour relation log. Accordingly, the mobile device will re-log this neighbour relation. For example, consider that mobile device is in a first cell and it has a relation with a second cell marked as old in its neighbour relation log. The mobile device then detects a relation with a third cell which is not found in any of its old entries. The mobile device then deletes the entry for the relation with the second cell and replaces it with the relation with the third cell. Shortly after, the mobile device then detects the second cell again and performs the same check and finds that a relation with the second cell is not an old entry because it has recently deleted it and, hence, will re-log the relation with the second cell as another neighbour relation entry in the neighbour relation log. The likelihood of this occurring can be minimised by using the weighting method described above where, if a neighbour relation is frequently detected, it has a higher weight and it will be less likely to be replaced. So, considering the example mentioned above, when the mobile device needs to delete an entry to store the neighbour relation with the third cell it will look for an old entry that has the smallest weight of detection probability.

Altering Neighbour Relation Log and History List

The network (typically the radio network controller 170 and/or the small cell controller/gateway 230) may alter the history list or the neighbour relation log. For example, the network may preload the mobile device with a history list (or the neighbour relation log by setting the old bit for that preloaded entry) when it first configures the mobile device. This enables the network to prevent the mobile device from reporting a known neighbour cell that is deliberately not included in the neighbour cell list for a particular source cell. For example, this neighbour cell may be used to serve an area on top of a hill or across a river and, hence, mobile devices handing over to this neighbouring cell will increase its load and, in the case of the river, may not be able to hand over to cells that are beyond the river (assuming the mobile device can't cross the river). Additionally, the radio network controller may black-list cells for which automatic neighbour reporting shall not be done. For example, a list of Physical Cell Identifiers or Cell IDs that are not be reported may be preloaded into the mobile device because the radio network controller knows that they are unsuitable for handover within the serving cell (a so called hot-spot area created by a base station that is far way, but yet the radio path loss is low on account of peculiar radio propagation conditions). As the mobile device runs the neighbour detection operations of the automatic neighbour relation functions it will change this preloaded history list.

The network may also flush the mobile device history list during reconfiguration for automatic neighbour relation functions. The network may decide, based on the detection probability weighting, that some reported neighbour relations have a strong signal strength when detected, but have very low probability of being detected and, hence, it may want to re-evaluate these neighbour relations for inclusion in the neighbour cell list for the source cell. By flushing the history list or the neighbour relation log (by not setting the old bit), the network will force the mobile device to re-evaluate an area. Such flushing may involve the deletion of all or specified entries in the history list.

Accordingly, it can be seen that in embodiments, the mobile device maintains a history list containing neighbour relations that have already been reported. In embodiments, the information stored in the history list is a sub-set of the information contained in a neighbour relation log. In embodiments, the mobile device maintains a neighbour relation log which contains newly detected neighbour relations. New neighbour relations stored in the neighbour relation log may be provided to the network when automatic neighbour relation functions are stopped. In embodiments, a probability of detection weighting is provided for each entry in the neighbour relation log and the history list. This is for use when the history list has limited space and it needs to be decided which neighbour relation entry to delete. In embodiments, the probability of detection weight is uploaded to the network for use when determining which detected neighbours to include in the neighbour cell list. In embodiments, the history list and neighbour relation log can be merged and an old bit is added to identify which neighbour relation entry has already been reported to the network. A neighbour relation entry with an old bit set indicates that this entry can be replaced with a newly detected neighbour relation entry. In embodiments, the network can provide a history list. In embodiments, the network can flash the history list or re-set the old bit in a merged list.

Example operations will now be described in more detail.

EXAMPLE 1

Separate Neighbour Relation Log and History List

Figure 3:
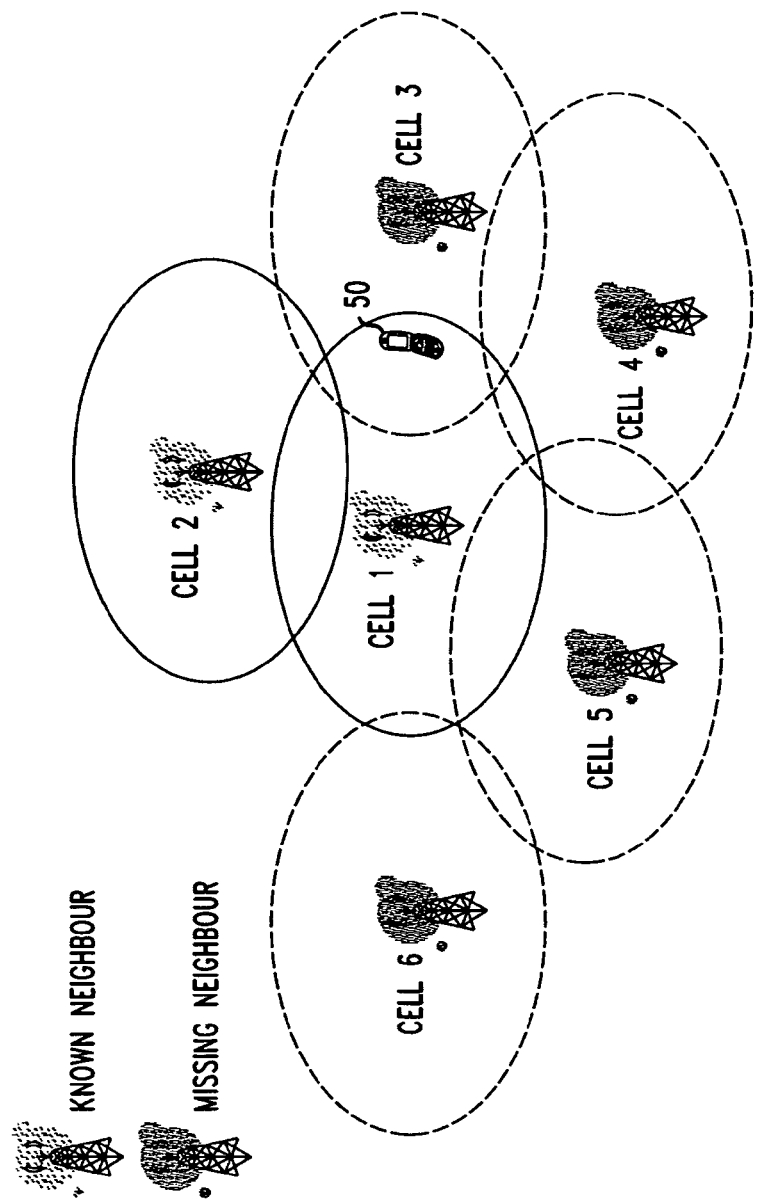
FIGS. 3 to 5 show example deployments of a mobile device.

FIG. 3 shows an example deployment of a mobile device (in this example user equipment 50) with the wireless telecommunications network 10. In this example, a mixture of cells provided by, for example, macro base stations or small cell base stations in the vicinity of the user equipment 50.

User equipment 50 is supported by Cell 1 (the source cell) and only Cell 2 is a known neighbour to Cell 1 because it is included in Cell 1's NCL. The other cells, namely Cell 3, Cell 4, Cell 5 and Cell 6 are missing neighbours. The user of the user equipment 50 in this example sits in a café and occasionally checks his laptop or smartphone and, hence, the user equipment 50 is mostly in an inactive state (such as, for example, a cell paging channel (Cell_PCH) state or an idle State) with an occasional burst of traffic to receive or send some user information. When this user equipment 50 is in an active state, the network (in the example the radio network controller 40) decides to configure the user equipment 50 for automatic neighbour relations.

When the user equipment 50 transitions to an inactive state, it performs automatic neighbour relation functions, detects Cell 3 and Cell 4 and logs them into its neighbour relation log. In this example, the neighbour relation log can store four entries, as shown in Table 1. It will be appreciated that more than four entries could be provided. Likewise, more measurements than those shown in Table 1 could be provided in the neighbour relation log.

TABLE 1 neighbour relation log after detecting Cell 3 and Cell 4

| | Neighbour Relation | | Detected Neighbour Measurements | | | |
|---|---|---|---|---|---|---|
| Entry | Source Cell ID | Detected Neighbour Cell ID | RSCP (dBm) | Eb/No (dB) | PLMN | Freq (MHz) |
| 1 | 1 | 3 | −98 | 2 | 12345 | 1932.5 |
| 2 | 1 | 4 | −101 | 1.5 | 12345 | 1932.5 |
| 3 | | | | | | |
| 4 | | | | | | |

The user equipment 50 then transitions back to an active state to download some user data, thereby interrupting the detection aspects of the automatic neighbour relation functions. The user equipment 50 indicates to the network that it has entries in its neighbour relation log. The network then requests this neighbour relation log and the user equipment 50 uploads its neighbour relation log. After uploading the neighbour relation log, the user equipment 50 puts these entries into its history list, deletes the entries in the neighbour relation log and transitions back to an inactive state where it can resume the detection aspects of the automatic neighbour relation functions. The network may then update Cell 1's NCL to indicate Cell 3 and Cell 4. The neighbour relation log is now empty. The contents of the history list are as shown in Table 2.

TABLE 2 history list after uploading neighbour relation log

| | Neighbour Relation | | | |
|---|---|---|---|---|
| Entry | Source Cell ID | Detected Neighbour Cell ID | PLMN | Freq (MHz) |
| 1 | 1 | 3 | 12345 | 1932.5 |
| 2 | 1 | 4 | 12345 | 1932.5 |
| 3 | | | | |
| 4 | | | | |

Figure 4:
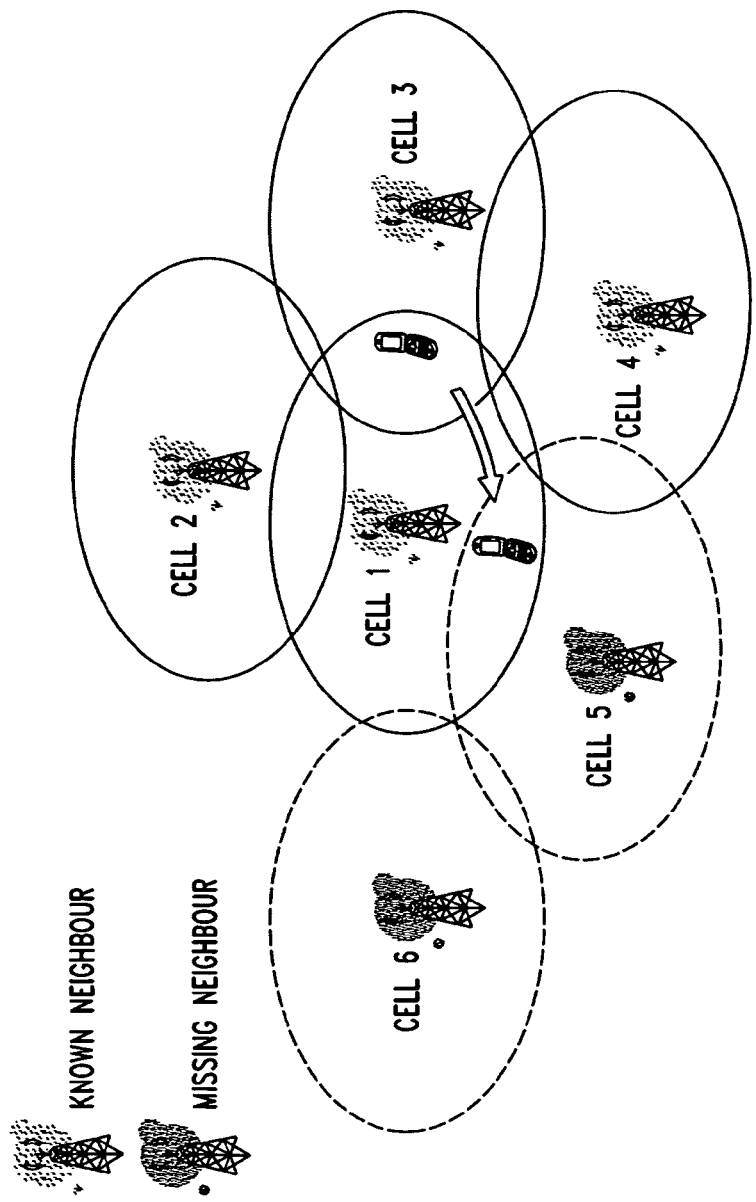

In this example, the user equipment 50 then moves to a position where it can detect Cell 5, as shown in FIG. 4. At this location, the user equipment 50 also detects Cell 4. However, the neighbour relation for Cell 4 (as seen in Cell 1) is already in the history list (see Table 2) and hence the user equipment 50 does not log this neighbour relation into its neighbour relation log. The neighbour relation log hence contains only the neighbour relation with Cell 5 at this point, as shown in Table 3.

TABLE 3 neighbour relation log after detecting Cell 4 and Cell 5

| | Neighbour Relation | | Detected Neighbour Measurements | | | |
|---|---|---|---|---|---|---|
| Entry | Source Cell ID | Neighbour Cell ID | RSCP (dBm) | Eb/No (dB) | PLMN | Freq (MHz) |
| 1 | 1 | 5 | −96 | 3 | 12345 | 1932.5 |
| 2 | | | | | | |
| 3 | | | | | | |
| 4 | | | | | | |

Hence, the user equipment 50 avoided having to consume resources and power to re-read the system information of Cell 4 and then consume further resources and power to report this duplicated information to the network when it next transitions to an active state.

Again, when user equipment 50 then transitions back to an active state, thereby interrupting the detection aspects of the automatic neighbour relation functions, the user equipment 50 indicates to the network that it has entries in its neighbour relation log. The network then requests this neighbour relation log and the user equipment 50 uploads its neighbour relation log. After uploading the neighbour relation log, the user equipment 50 puts these entries into its history list, deletes the entries in the neighbour relation log and transitions back to an inactive state where it can resume the detection aspects of the automatic neighbour relation functions. The network may then update Cell 1's NCL to indicate Cell 5. The neighbour relation log is now empty.

EXAMPLE 2

Weight Detection

As mentioned above, FIG. 3 shows an example deployment of user equipment 50 with the wireless telecommunications network 10. In this example, a mixture of cells provided by, for example, macro base stations or small cell base stations are provided in the vicinity of the user equipment 50, as mentioned above.

In the example, a probability of detection weighting is included in the neighbour relation log and the history list.

The user equipment 50 starts in the location as shown in FIG. 3 and, when in the inactive state, performs the detection aspects of the automatic neighbour relation functions where it detects Cell 3 and Cell 4. Since the user sits at a café, the user equipment 50 will detect Cell 3 and Cell 4 numerous times. In this example, the user equipment 50 detects Cell 3 and Cell 4 1000 times each whilst the user equipment 50 is being supported by Cell 1 (the source cell).

It will be appreciated that there are many ways to calculate the probability of detection weighting. In this example, the probability for each cell is calculated as the number of times a neighbour relation is seen divided by the total times all neighbour relations are seen. The calculation is as shown in Table 4.

TABLE 4

Probability of detection weight calculation for Cell 3 and Cell 4

| Cell ID | | Number of | |
|---|---|---|---|
| Source | Detected | Detections | Weight |
| 1 | 3 | 1000 | 0.5 |
| 1 | 4 | 1000 | 0.5 |
| Total | | 2000 | |

The user equipment 50 then moves into an active state thereby interrupting the detection aspects of the automatic neighbour relation functions. The user equipment 50 indicates to the network that it has entries in its neighbour relation log. The network then requests this neighbour relation log and the user equipment 50 uploads its neighbour relation log. After uploading the neighbour relation log, the user equipment 50 puts these entries into its history list, deletes the entries in the neighbour relation log and transitions back to an inactive state where it can resume the detection aspects of the automatic neighbour relation functions. The network may then update Cell 1's NCL to indicate Cell 3 and Cell 4, typically dependent on the weight achieving a predetermined minimum threshold. The neighbour relation log is now empty.

The user then moves across the street to greet a friend and thereby moves to the location shown in FIG. 4 and the user equipment 50 detects Cell 5 and Cell 4. At this point, the user equipment 50 only logs the neighbour relation with Cell 5 into its neighbour relation log since the neighbour relation with Cell 4 is already in the history list. At the end of the conversation with the user's friend, the user equipment 50 has detected Cell 4 & Cell 5 500 times each. The probability of detection weight is hence:

TABLE 5

Probability of detection weight calculation

| Cell ID | | Number of | |
|---|---|---|---|
| Source | Detected | Detections | Weight |
| 1 | 3 | 1000 | 0.333 |
| 1 | 4 | 1500 | 0.5 |
| 1 | 5 | 500 | 0.1667 |
| Total | | 3000 | |

The user equipment 50 transitions into an active state thereby interrupting the detection aspects of the automatic neighbour relation functions. The user equipment 50 indicates to the network that it has entries in its neighbour relation log. The network then requests this neighbour relation log and the user equipment 50 uploads its neighbour relation log containing only the neighbour relation with Cell 5. After uploading the neighbour relation log, the user equipment 50 puts this entry into its history list, deletes the entry in the neighbour relation log and transitions back to an inactive state where it can resume the detection aspects of the automatic neighbour relation functions. The network may then update Cell 1's NCL to indicate Cell 5, typically dependent on the weight achieving a predetermined minimum threshold. The neighbour relation log is now empty.

In this example the history list can only contain three entries and after uploading the neighbour relation log, the history list is as follows:

TABLE 6

History List after uploading neighbour relation Log

| | Neighbour Relation (Cell ID) | | | | |
|---|---|---|---|---|---|
| Entry | Source | Detected | PLMN | Freq (MHz) | Weight |
| 1 | 1 | 3 | 12345 | 1932.5 | 0.333 |
| 2 | 1 | 4 | 12345 | 1932.5 | 0.5 |
| 3 | 1 | 5 | 12345 | 1932.5 | 0.1667 |

Figure 5:
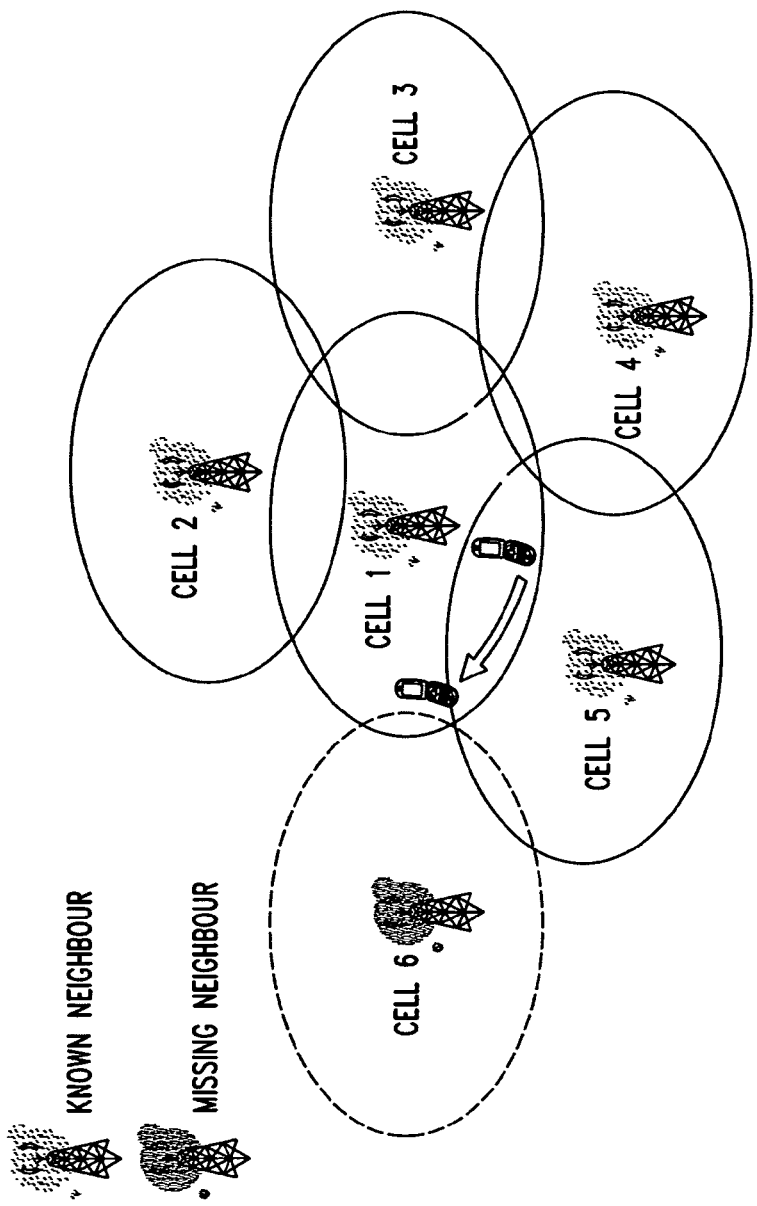

The user then sees something of interest in a nearby store and moves to a location as shown in FIG. 5 where the user equipment 50 detects Cell 6 and Cell 5. During this time, the user equipment 50 detects Cell 5 and Cell 6 200 times each. At this point, the user equipment 50 only logs the neighbour relation with Cell 6 into its neighbour relation log since the neighbour relation with Cell 5 is already in the history list. The user then walks back to the café and is then back to the location shown in FIG. 3.

The user equipment 50 then sees Cell 3 and Cell 4 another 500 times before moving into an active state. The probability of detection weight is thus:

TABLE 7

Probability of detection weight calculation

| Cell ID | | Number of | |
|---|---|---|---|
| Source | Detected | Detections | Weight |
| 1 | 3 | 1500 | 0.34 |
| 1 | 4 | 2000 | 0.45 |
| 1 | 5 | 700 | 0.159 |
| 1 | 6 | 200 | 0.045 |
| Total | | 4400 | |

The user equipment 50 then moves into an active state thereby interrupting the detection aspects of the automatic neighbour relation functions. The user equipment 50 indicates to the network that it has entries in its neighbour relation log. The network then requests this neighbour relation log and the user equipment 50 uploads its neighbour relation log containing only the neighbour relation with Cell 6.

After uploading the neighbour relation log, the user equipment 50 seeks to put this entry into its history list. However, the history list can only contain three entries and hence one of these entries needs to be discarded. Since the neighbour relation with Cell 6 has the lowest probability of detection, this neighbour relation is not included in the history list.

At this point the probability of detection weight calculation should exclude Cell 6. The updated history log is as shown in Table 8. The user equipment 50 transitions back to an inactive state where it can resume the detection aspects of the automatic neighbour relation functions. The neighbour relation log is now empty.

TABLE 8

Updated History List after uploading neighbour relation Log

| | Neighbour Relation (Cell ID) | | | | |
|---|---|---|---|---|---|
| Entry | Source | Detected | PLMN | Freq (MHz) | Weight |
| 1 | 1 | 3 | 12345 | 1932.5 | 0.357 |
| 2 | 1 | 4 | 12345 | 1932.5 | 0.476 |
| 3 | 1 | 5 | 12345 | 1932.5 | 0.1667 |

EXAMPLE 3

Combined Neighbour Relation Loa and History List

In this example, the history list and neighbour relation log is merged into a single table. The use of an "old" bit in the table enables the functionality provided by the history table mentioned above to be incorporated in a single table.

In this example, the user equipment 50 also starts at the location shown in FIG. 3, as mentioned above, and the user equipment 50 detects Cell 3 and Cell 4.

The neighbour relation/history log can store only 3 entries in this example and they are as shown in Table 9.

TABLE 9

Combined neighbour relation/History Log after detecting Cell 3 and Cell 4

| | Neighbour Relation (Cell ID) | | | | Detected Neighbour Measurements | | | |
|---|---|---|---|---|---|---|---|---|
| Entry | Source | Detected | Old Bit | Weight | RSCP (dBm) | Eb/No (dB) | PLMN | Freq (MHz) |
| 1 | 1 | 3 | Not Set | 0.5 | −98 | 2 | 12345 | 1932.5 |
| 2 | 1 | 4 | Not Set | 0.5 | −101 | 1.5 | 12345 | 1932.5 |
| 3 | | | | | | | | |

The user equipment 50 then moves into the active state and uploads the neighbour relation logs. The user equipment 50 then sets the "old" bits to true for entry 1 and 2 resulting in the neighbour relation/history log as in Table 10.

TABLE 10

Combined neighbour relation/History Log after detecting uploading neighbour relation

| | Neighbour Relation (Cell ID) | | | | Detected Neighbour Measurements | | | |
|---|---|---|---|---|---|---|---|---|
| Entry | Source | Detected | Old Bit | Weight | RSCP (dBm) | Eb/No (dB) | PLMN | Freq (MHz) |
| 1 | 1 | 3 | Set | 0.5 | −98 | 2 | 12345 | 1932.5 |
| 2 | 1 | 4 | Set | 0.5 | −101 | 1.5 | 12345 | 1932.5 |
| 3 | | | | | | | | |

The user equipment 50 then moves to the location shown in FIG. 4 where it detects Cell 4 and Cell 5. Since the neighbour relation with Cell 4 is already in the neighbour relation/history log with the old bit set, the user equipment 50 does not log this entry. However, the neighbour relation with Cell 5 is a new entry as it cannot be found in the neighbour relation/history log and hence the user equipment 50 logs the neighbour relation with Cell 5. At this point, the user equipment 50 detects less of the neighbour relation with Cell 3 and its probability of detection weight is hence reduced. The neighbour relation/history log is as shown in Table 11.

TABLE 11

Combined neighbour relation/History Log after detecting Cell 5

| | Neighbour Relation (Cell ID) | | | | Detected Neighbour Measurements | | | |
|---|---|---|---|---|---|---|---|---|
| Entry | Source | Detected | Old Bit | Weight | RSCP (dBm) | Eb/No (dB) | PLMN | Freq (MHz) |
| 1 | 1 | 3 | Set | 0.25 | −98 | 2 | 12345 | 1932.5 |
| 2 | 1 | 4 | Set | 0.5 | −101 | 1.5 | 12345 | 1932.5 |
| 3 | 1 | 5 | Not Set | 0.25 | −100 | 1.8 | 12345 | 1932.5 |

The user equipment 50 then moves to the location indicated in FIG. 5 where it detects Cell 5 and Cell 6. The neighbour relation with Cell 6 is not found in any of the entries in the neighbour relation/history log for which the old bit has been set. Hence, the user equipment 50 logs this neighbour relation with Cell 6. Entries with the old bit set can be overwritten since those entries have been provided previously to the network (such as entry 1 or entry 2 for neighbour relation with Cell 3 and Cell 4 respectively). Since the neighbour relation with Cell 3 has a lower probability of detection weight, this entry is deleted and replaced with a neighbour relation with Cell 6. The final neighbour relation/history log is shown in Table 12.

TABLE 12

| | Neighbour Relation (Cell ID) | | | | Detected Neighbour Measurements | | | |
|---|---|---|---|---|---|---|---|---|
| Entry | Source | Detected | Old Bit | Weight | RSCP (dBm) | Eb/No (dB0 | PLMN | Freq (MHz) |
| 1 | 1 | 6 | Not Set | 0.2 | −99 | 2.1 | 12345 | 1932.5 |
| 2 | 1 | 4 | Set | 0.5 | −101 | 1.5 | 12345 | 1932.5 |
| 3 | 1 | 5 | Not Set | 0.3 | −100 | 1.8 | 12345 | 1932.5 |

Hence, it can be seen that techniques are provided which prevent mobile devices from re-logging and re-reporting previously reported neighbour relations. This avoids the mobile devices from performing the resource intensive task of decoding the system information and performing measurements on detected neighbours that have already been reported. This also avoids providing this duplicate information to the network. This approach is readily implemented and saves user equipment resources and minimises redundant information from being sent to the network.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A mobile device, comprising:
at least one processor and associated memory; and
a non-transitory computer-readable medium storing program instructions that, when executed by the at least one processor, cause the mobile device to perform a method of performing automatic neighbour relation functions in a wireless telecommunication network;
wherein the at least one processor is configured to measure characteristics of a neighbouring cell when the mobile device is operated in an automatic neighbour relation mode;
wherein the at least one processor is configured to determine whether a neighbour relation was previously provided by the mobile device to a network node of the wireless telecommunications network based on the characteristics of the neighbouring cell and on a weighted indication of neighbour relations that were previously provided to the network node by the mobile station;
wherein the at least one processor is configured to generate a new neighbour relation to the neighbouring cell after determining no neighbour relation to the neighbouring cell was previously provided by the mobile device to said network node of the wireless telecommunication network;
wherein the mobile device is configured to provide the new neighbour relation derived by the mobile device to the network node.

2. The mobile device of claim 1, wherein each neighbour relation comprises an indication of a serving cell supporting said network node and an indication of the corresponding neighbouring cell.

3. The mobile device of claim 1, further comprising;
a storage device configured to store said new neighbour relation as an entry in a neighbour relation log.

4. The mobile device of claim 3, wherein said neighbour relation log comprises a previously provided indicator operable to indicate when an associated neighbour relation has been previously provided to said network node.

5. The mobile device of claim 4, wherein said at least one processor is configured to store said new neighbour relation in the neighbour relation log by replacing an entry whose previously provided indicator indicates that said entry has been previously provided to said network node.

6. The mobile device of claim 1, further comprising;
a storage device configured to store neighbour relations previously provided to said network node in a history list.

7. The mobile device of claim 6, wherein each neighbour relation comprises a weight indication indicating how often a neighbouring cell has been detected by said mobile device.

8. The mobile device of claim 7, wherein said at least one processor is configured to store said new neighbour relation in the history list by replacing an entry whose weight indication indicates that said entry has been detected least by said mobile device.

9. The mobile device of claim 1, wherein said at least one processor is configured to measure characteristics of a pilot signal from said neighbouring cell.

10. The mobile device of claim 1, wherein said mobile device is operable, upon interrupting said automatic neighbour relation mode, to provide said new neighbour relation to said network node.

11. The mobile device of claim 7, wherein said mobile device is operable, upon interrupting said automatic neighbour relation mode, to provide said weight indications associated with at least said new neighbour relation to said network node.

12. The mobile device of claim 1, comprising
a storage device configured to store the new neighbour relation as an entry in a neighbour relation log;
wherein the storage device is configured to store neighbour relations previously provided to the network node in a history list;
wherein the at least one processor is configured to alter entries of at least one of said neighbour relation log and said history list in response to an indication received from said network node.

13. The mobile device of claim 12, wherein said at least one processor is configured to perform at least one of preload entries and delete entries of at least one of said neighbour relation log and said history list in response to an indication from said network node.

14. A method of performing automatic neighbour relation functions in a wireless telecommunications network, said method comprising:
measuring characteristics of a neighbouring cell at a mobile device when the mobile device is operating in an automatic neighbour relation mode;
determining, at the mobile device, whether a neighbour relation was previously provided by the mobile device to a network node of the wireless telecommunications network based on the characteristics of the neighbouring cell and on a weighted indication of neighbour relations previously provided to the network node by the mobile station;
generating a new neighbour relation to the neighbouring cell at the mobile device after determining no neighbour relation was previously provided by the mobile device to said network node of the wireless telecommunication network; and
providing the new neighbour relation derived by the mobile device to the network node.

15. The method of claim 14, further comprising;
storing the new neighbour relation as an entry in a neighbour relation log at a storage device in the mobile device, wherein the neighbour relation log comprises a previously provided indicator operable to indicate when an associated neighbour relation has been previously provided to the network node; and
storing the new neighbour relation in the neighbour relation log by replacing an entry whose previously provided indicator indicates that the entry has been previously provided to the network node.

16. The method of claim 14, further comprising;
storing neighbour relations previously provided to the network node in a history list at a storage device in the mobile device, wherein each neighbour relation comprises a weight indication indicating how often a neighbouring cell has been detected by the mobile device;
storing the new neighbour relation in the history list by replacing an entry whose weight indication indicates that the entry has been detected least by the mobile device; and
upon interrupting the automatic neighbour relation mode, providing the weight indications associated with at least the new neighbour relation to the network node.

17. The method of claim 14, further comprising:
measuring characteristics of a pilot signal from the neighbouring cell at the mobile device.

18. The method of claim 14, further comprising:
upon interrupting the automatic neighbour relation mode, providing the new neighbour relation to the network node.

19. The method of claim 14, further comprising
storing the new neighbour relation as an entry in a neighbour relation log at a storage device in the mobile device;
storing neighbour relations previously provided to the network node in a history list at the storage device;
altering entries of at least one of the neighbour relation log and the history list in response to an indication received from the network node; and
performing at least one of preloading entries and deleting entries of at least one of the neighbour relation log and the history list in response to an indication from the network node.

20. A non-transitory computer-readable medium storing program instructions that, when executed by a processor, cause a processor-controlled mobile device to perform a method of performing automatic neighbour relation functions in a wireless telecommunications network, the method comprising:
measuring characteristics of a neighbouring cell at a mobile device when the mobile device is operating in an automatic neighbour relation mode;
determining, at the mobile device, whether a neighbour relation was previously provided by the mobile device to a network node of the wireless telecommunications network based on the characteristics of the neighbouring cell and on a weighted indication of neighbour relations previously provided to the network node by the mobile station;
generating a new neighbour relation to the neighbouring cell at the mobile device after determining no neighbour relation was previously provided by the mobile device to said network node of the wireless telecommunication network; and providing the new neighbour relation derived by the mobile device to the network node.

* * * * *